Sept. 2, 1941.  M. S. GRAVES  2,254,523
BRAKE CONTROL DEVICE
Filed Oct. 17, 1938
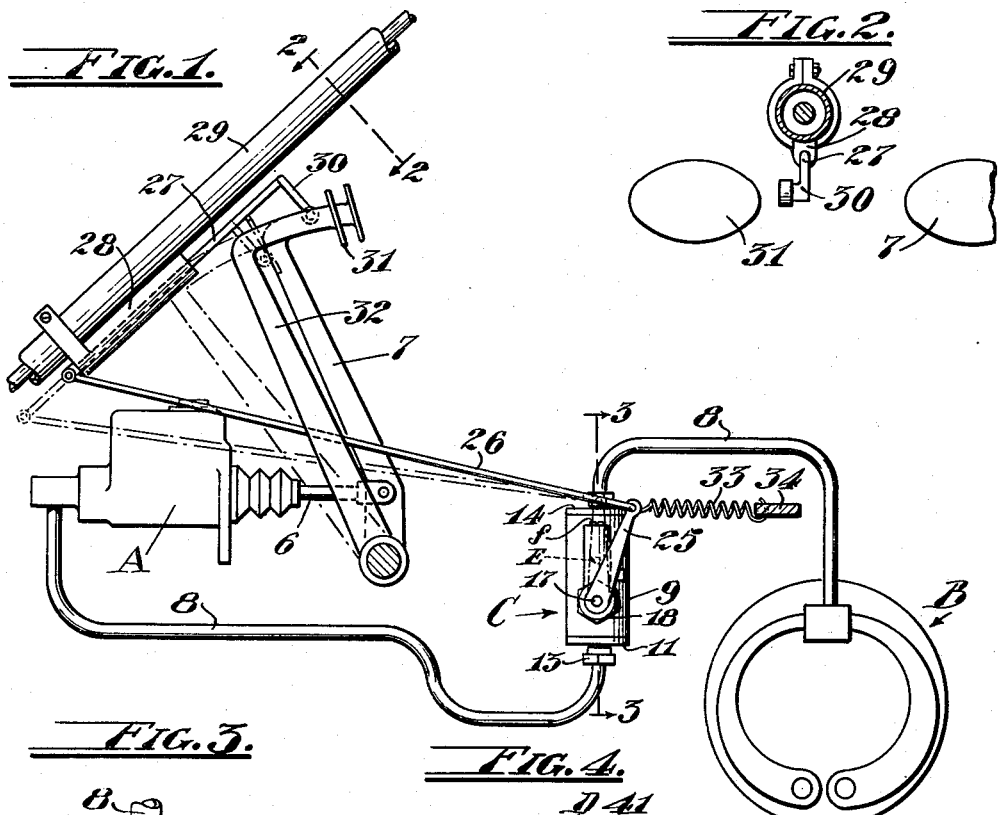
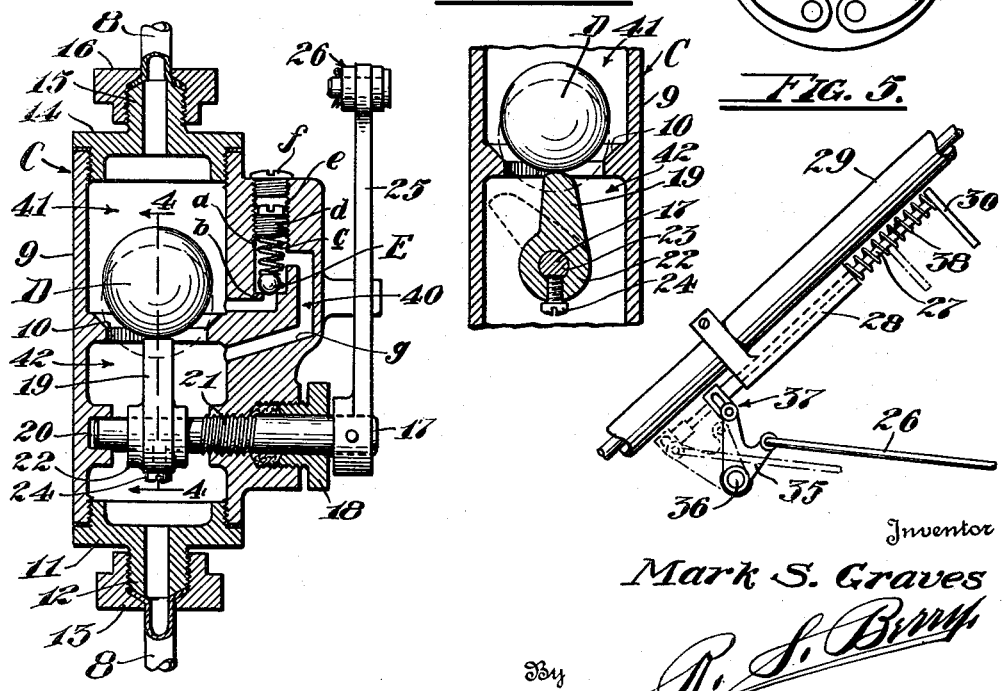
Inventor
Mark S. Graves Patented Sept. 2, 1941

2,254,523

UNITED STATES PATENT OFFICE 2,254,523

BRAKE CONTROL DEVICE

Mark S. Graves, Los Angeles, Calif.

Application October 17, 1938, Serial No. 235,373

2 Claims. (Cl. 251—132)

This invention relates to a device for controlling fluid pressure operated brakes such as are employed on motor vehicles, and more particularly pertains to a device for automatically preventing release of the brakes while the vehicle clutch pedal is held in a clutch disengaging position; the present invention being an improvement on the construction set forth in my application for Letters Patent Serial Number 172,562 filed November 3, 1937, now Patent No. 2,152,686, granted April 4, 1939.

An object of the invention is to provide a device of the above character embodying a self-closing control valve arranged in the fluid pressure delivery line of a fluid pressure operated brake system in which the valve is so arranged as to open under the flow of fluid under pressure from the source of pressure supply to the brake mechanism and to automatically close on cessation of the flow of fluid pressure so as to prevent the release of the brakes in event the vehicle clutch is disengaged; the invention embodying a mechanism associated with the clutch operating mechanism for holding the control valve in its open position while the clutch mechanism is engaged and to release the control valve on placing the vehicle clutch in its released position on depression of the clutch operating foot pedal.

Another object of the invention is to provide a control valve of the character above described so mounted and arranged as to be gravity operated to its closed position and which will so operate irrespective of any direction of inclination of the motor vehicle to which it is applied while the latter is in an upright position.

Another object is to provide a construction in the valve opening mechanism whereby on advancing the clutch operating lever to effect disengagement of the clutch mechanism, the control valve will close almost immediately after the clutch lever has been advanced a portion of its stroke from its normal position.

Another object is to provide an arrangement whereby the control valve may be operated and utilized as an emergency brake independent of the clutch control mechanism.

Another object is to provide a construction in the control valve for relieving excessive pressures as may be developed in the brake line by repeated operation of the brake pedal, so as to permit such repeated operations of the pedal without danger of bursting the brake lines or the brake actuating parts, and in which the device may be set to effect by-passing of the brake operating fluid at any predetermined pressure.

A further object is to provide a device of the above character which is adapted to be applied to a motor vehicle without connecting to any part of the clutch mechanism and whereby it may be easily installed as an accessory in most automobiles of conventional construction now in use.

With the foregoing objects in view, together with such other objects and advantages as may subsequently appear, the invention is carried into effect as illustrated by way of example in the accompanying drawing in which:

Fig. 1 is a diagram in side elevation depicting the invention as applied;

Fig. 2 is a section and plan view taken on the line 2—2 of Fig. 1;

Fig. 3 is a view in vertical section taken on the line 3—3 of Fig. 1 showing the construction and mode of operation of the control valve;

Fig. 4 is a detail in section and elevation taken on the line 4—4 of Fig. 3 showing the manner in which the control valve is held in its open position;

Fig. 5 is a detail in section depicting a modified form of the valve operating structure.

Referring to the drawing more specifically A indicates generally the master cylinder of a hydraulic brake system which is of the usual type and embodies a cylinder and piston (not shown) for creating a fluid pressure in the system in effecting application of the brakes; the piston being attached to a connecting rod 6 operatively connected to a brake pedal 7.

Leading from the master cylinder A is a fluid conductor 8 which leads to the wheel brakes B (only one being diagrammatically illustrated) in which conductor is arranged a control valve indicated generally at C.

The control valve C embodies an upstanding cylindrical valve housing 9 formed intermediate its ends with a valve seat 10 and fitted with an upwardly opening valve D which is adapted to normally gravitate to a closed position on the seat 10. The housing 9 is fitted at its lower end with a cap 11 formed with a nipple 12 opening to the interior of the lower end portion of the housing and which nipple is attached by a coupling 13 to the length of the conduit 8 leading from the fluid pressure supply in the master cylinder A. The upper end of the housing 9 is fitted with a cap 14 on which is formed a nipple 15 opening to the interior of the upper end portion of the housing 9 and to which nipple is attached by a coupling 16 the portion of the conduit 8 leading to the brakes B.

Means are provided for holding the valve D in an open position which means embodies a rock shaft 17 extending laterally into the housing 9 through a packing gland 18 carried on the latter, and on which shaft is mounted interiorly of the housing 9 an upstanding finger 19 which when disposed in an upright position will serve to prevent the valve D from advancing to its closed position on the valve seat 10, but which finger 19 is adapted on turning the rock shaft 17 to be positioned out of engagement with the valve D to allow the latter to gravitate to its closed position on the seat 10.

The valve D preferably embodies a ball formed of steel or other suitable metal of sufficient weight to readily move to its seated position on the valve seat 10 on moving the finger 19 out of engagement therewith.

The inner end of the shaft 17 seats in a socket 20 in the side wall of the housing 9 opposite that through which the shaft 17 extends. As a means for holding the shaft 17 against excessive longitudinal movement, as under the influence of vibrations, the shaft is formed intermediate its ends with screw threads 21 which have threaded engagement with the valve housing 9; the threads 21 permitting the requisite slight rotary movement of the shaft in effecting operation of the valve with but slight longitudinal movement of the shaft. This threaded connection between the shaft and the valve housing also serves in cooperation with the packing gland 18 to prevent leakage of the brake operating fluid from the interior of the valve housing to the exterior thereof along the shaft 17.

The finger 19 is mounted on a hub 22 formed with an opening 23 adapted to receive the inner end of the shaft 17 and which hub is fitted with a set screw 24 for effecting engagement with the shaft 17 to hold the hub 22 and finger 19 against turning on the shaft. In assembling the hub on the shaft it is positioned interiorly of the valve housing 9 through the open end of the latter afforded on removal of the cap 11; the hub being initially positioned within the valve housing with the finger 19 thereon presented toward the valve D and being held therein until the shaft 17 is screwed into place with the inner end thereof passing through the hub 22 and extending into the recess 20 and whereupon the set screw 24 is tightened into engagement with the shaft 17.

The outer end of the shaft 17 is fitted with a crank arm 25 to which is pivotally attached a link 26 leading to a reciprocal operating stem 27 so arranged and connected to the link 26 that longitudinal movement of the stem will act through the link 26 to turn the shaft 17 a partial revolution. The stem 27 is here shown as slidably supported in a guide way 28 carried on the steering wheel column 29 of the motor vehicle. The upper outer end of the stem 27 is formed with a bend 30 which leads to a point adjacent to but spaced from the tread 31 of a clutch operating foot pedal 32; the extension 30 being so located that when the foot pedal 32 is depressed by the foot of the operator the extension 30 will be in the path of the downward movement of a portion of the operator's shoe projecting beyond the margin of the pedal tread 31 and such that on downward movement of the foot and tread in effecting release of the clutch controlled by the clutch pedal the stem 27 will be depressed sufficiently to effect the requisite rocking of the lever arm 25 and shaft 17 as will presently be described.

In the construction shown in Fig. 1 the stem 27 extends at an acute angle relative to the link 26 and the outer end of the link 26 is pivotally connected directly to the lower end of the stem 27 whereby downward movement of the stem 27 will exert a direct longitudinal pull on the link 26 to advance the arm 25. A spring 33 connects with the arm 25 and with a fixed member 34 and is tensioned to exert a pull on the arm 25 so as to normally maintain the latter in a retracted position and to act through the link 26 to dispose the stem 27 in its normal uppermost position and in which position of the arm 25 the finger 19 on the shaft 17 will be disposed in its upright position to hold the valve D off its seat and in an open position.

In the arrangement shown in Fig. 5 the outer end of the link 26 is indirectly connected to the stem 27 through a bell crank lever 35 pivoted at 36, one arm of which lever is pivotally connected to the link 26 and the other arm of which is connected to the stem 27 by a pin and slot connection 37. A spring 38 is interposed between the guide way 28 and the bend 30 on the stem 27 to normally maintain the latter in its uppermost position and which spring may operate in conjunction with the spring 33 or in lieu thereof in holding the valve D in its open position.

As a means for preventing excessive pressures being developed in the brake line by successive operations of the brake lever when the valve D is in its closed position, a by-pass relief valve E is provided, which valve is here shown as embodying an upwardly opening ball arranged in a passage 40 formed in the valve housing 9 and leading from a point in the valve chamber 41 above the valve seat 10 to a point in the chamber 42 below the valve seat 10; the passage 40 being here shown as formed with an upwardly extending portion *a* communicating with the chamber 41 and having a seat *b* on which the ball valve E normally rests under the urge of a spring *c* which bears between the valve E and an adjustable screw plug *d* threaded in an extension *e* of the passage *a*; the passage extension *e* opening upwardly at the upper end of the valve housing 9 and being closed by a removable screw plug *f*. The passage *a* connects at a point below the plug *d* with a downwardly leading passage *g* which communicates with the chamber 42. The adjustable plug *d* affords a means for varying the tension of the spring *c* to vary the resistance to opening of the valve E, and whereby the point of pressure relief may be varied to meet varying conditions as occasion may require.

Normally the parts are disposed as shown in full lines in the drawings, that is, with the valve D held in its open position by the upstanding finger 19 under the urge of the spring 33 or 38 in exerting a pull on the arm 25, that is, while the clutch lever 32 is in the normally retracted position it occupies when the clutch controlled thereby is in its engaged position. While the valve D is thus maintained open flow of the brake operating fluid may occur in either direction through the valve housing 9, but when the valve D is in its closed position such flow is restricted to the direction leading from the master cylinder A to the brakes B. It follows that in the operation of the invention, when the clutch lever 25 is disposed in its normal retracted position with the clutch in its engaged position, and the valve D held in its open position, the vehicle brakes B may be freely applied and released by operation of the brake lever 7 in the usual manner; but on depressing the clutch lever to release the clutch then the rock shaft 17 will be turned by the forward movement of the operator's foot on the tread of the clutch lever through the link 26, so as to move the finger 19 from beneath the valve D thereby allowing the latter to advance to its closed position. When this occurs and the brakes are applied while the clutch lever is advanced and the clutch is disengaged, release of the brakes will be prevented by reason of the valve D then being closed so as to confine the brake operating fluid in the conduit 8 between the valve and the brakes B, until such time as the clutch lever is released to re-engage the clutch.

In event it is desired to effect closing of the valve D independent of operation of the clutch, such may be accomplished by the operator merely by shifting his foot from the tread 31 into engagement with the end portion 30 of the stem 27 and then depressing the latter. The action is desirable where the vehicle is stopped on a grade with the motor running and the clutch engaged with the transmission in neutral; closing of the valve D and at the same time applying the brakes by operation of the brake lever serving to permit release of the brake lever while the stem 27 is depressed and the valve D thus maintained closed, without effecting release of the brakes. In thus employing the invention, the clutch is first disengaged by depressing the clutch lever 32 independent of the valve control stem 27 so as to permit disposing the vehicle transmission in neutral in the well known manner. To release the brakes after such operation, the brake lever is first depressed to hold the brake operating fluid under pressure, whereupon the stem 17 is released and permitted to return to normal whereupon the valve D will be opened so as to permit back flow of the brake operating fluid on retraction of the brake lever. The clutch lever 32 is then operated to permit placing the transmission in gear in the usual manner.

In event of repeated operations of the brake lever while the valve D is closed, the successive applications will develop increasing pressures in the brake line forward of the valve D and such as might burst the line or blow out the brake cylinder, but by the provision of the relief valve E such action will be prevented, since on a pressure being developed forward of the valve D as will overcome the spring c the latter will yield and permit opening of the valve E so that a portion of the brake operating fluid forward of the valve D may be passed back to the other side of the valve D through the passage 40, on release of the brake lever.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. A valve for brake control systems embodying a housing having a passage leading therethrough, a valve seat intermediate the ends of said passage, a ball valve in said passage above said seat, a rock shaft extending through said housing into said passage below said seat, a finger on said shaft engageable with said valve to lift it from said seat, and a screw threaded connection between said shaft and valve housing on which said shaft is turnable, and spring means for exerting a turning force on and holding said shaft with the finger thereon holding the valve in its open position.

2. A valve for brake control systems embodying a housing having a passage leading therethrough, a valve seat in said passage, a valve in said passage, a rock shaft in said housing, a finger on said shaft engageable with said valve to lift it from said seat, a screw threaded connection between said shaft and valve housing on which said shaft is turnable, spring means tending to turn and thereby normally holding said shaft with the finger thereon holding the valve in its open position.

MARK S. GRAVES.